(12) United States Patent
Kobayashi et al.

(10) Patent No.: US 9,676,637 B2
(45) Date of Patent: Jun. 13, 2017

(54) ULTRAVIOLET IRRADIATION APPARATUS

(71) Applicant: Kabushiki Kaisha Toshiba, Minato-ku, Tokyo (JP)

(72) Inventors: Shinji Kobayashi, Machida Tokyo (JP); Norimitsu Abe, Kawasaki Kanagawa (JP); Takeshi Ide, Kunitachi Tokyo (JP); Akihiko Shirota, Hachioji Tokyo (JP); Kenji Takeuchi, Fuchu Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 14/916,551

(22) PCT Filed: Dec. 3, 2014

(86) PCT No.: PCT/JP2014/056457
§ 371 (c)(1),
(2) Date: Mar. 3, 2016

(87) PCT Pub. No.: WO2015/037256
PCT Pub. Date: Mar. 19, 2015

(65) Prior Publication Data
US 2016/0207794 A1 Jul. 21, 2016

(30) Foreign Application Priority Data

Sep. 11, 2013 (JP) ................................. 2013-188747

(51) Int. Cl.
*G01J 1/42* (2006.01)
*C02F 1/32* (2006.01)
(Continued)

(52) U.S. Cl.
CPC .............. *C02F 1/325* (2013.01); *G01J 1/429* (2013.01); *C02F 1/52* (2013.01); *C02F 1/76* (2013.01);
(Continued)

(58) Field of Classification Search
CPC ... G01N 1/34; G01J 1/0271; G01J 1/029; G01J 1/04; G01J 1/02; G01J 1/0448
See application file for complete search history.

(56) References Cited

U.S. PATENT DOCUMENTS

| 1,215,451 A | 2/1917 | White |
| 6,976,508 B2 | 12/2005 | Ueberall |

(Continued)

FOREIGN PATENT DOCUMENTS

| CN | 102369050 A | 3/2012 |
| JP | H07-060244 A | 3/1995 |

(Continued)

OTHER PUBLICATIONS

International Search Report dated Apr. 22, 2014 in PCT Application No. PCT/JP2014/056457, 7 pgs.

(Continued)

*Primary Examiner* — Kiho Kim
(74) *Attorney, Agent, or Firm* — Knobbe, Martens, Olson & Bear, LLP (57) ABSTRACT

According to an embodiment, an ultraviolet (UV) irradiation apparatus includes a treatment tank, a UV irradiation member, a UV sensor, and an air outlet unit. The air outlet unit is connected to an air outlet hole provided at a position higher than a horizontal plane that passes through the UV sensor, and is provided to release, to the outside of the treatment tank, through the air outlet hole, air that accumulates inside the treatment tank when the treated water lasses through the inside of the treatment tank.

6 Claims, 11 Drawing Sheets

(51) Int. Cl.
C02F 1/52 (2006.01)
C02F 1/76 (2006.01)
C02F 1/00 (2006.01)

(52) U.S. Cl.
CPC .. C02F 2001/007 (2013.01); C02F 2201/005 (2013.01); C02F 2201/322 (2013.01); C02F 2201/326 (2013.01); C02F 2201/3225 (2013.01); C02F 2201/3227 (2013.01); C02F 2209/42 (2013.01); C02F 2303/04 (2013.01)

(56) References Cited

U.S. PATENT DOCUMENTS

| | | | |
|---|---|---|---|
| 7,385,204 | B2 | 6/2008 | Bircher et al. |
| 7,683,339 | B2 * | 3/2010 | Gerardi-Fraser ....... C02F 1/325 250/372 |
| 8,552,395 | B2 | 10/2013 | Kobayashi et al. |
| 8,742,365 | B2 | 6/2014 | Abe et al. |
| 2003/0129105 | A1 | 7/2003 | Boehme |
| 2004/0011414 | A1 | 1/2004 | Ueberall |
| 2005/0092932 | A1 | 5/2005 | Bircher et al. |
| 2008/0121812 | A1 | 5/2008 | Bircher |
| 2008/0203004 | A1 | 8/2008 | Abe et al. |
| 2009/0288508 | A1 | 11/2009 | Devenyi |
| 2010/0139426 | A1 | 6/2010 | Mori et al. |
| 2011/0150707 | A1 | 6/2011 | Kobayashi et al. |
| 2011/0150708 | A1 | 6/2011 | Kobayashi et al. |
| 2011/0220813 | A1 | 9/2011 | Abe et al. |
| 2011/0226681 | A1 | 9/2011 | Lee et al. |
| 2012/0061585 | A1 | 3/2012 | Ide et al. |
| 2013/0062532 | A1 | 3/2013 | Abe et al. |
| 2014/0014853 | A1 | 1/2014 | Kobayashi et al. |

FOREIGN PATENT DOCUMENTS

| | | |
|---|---|---|
| JP | H09-038671 A | 2/1997 |
| JP | 2001-029941 A | 2/2001 |
| JP | 2002-263645 A | 9/2002 |
| JP | 2004-049953 A | 2/2004 |
| JP | 2005-270732 A | 10/2005 |
| JP | 2007-152304 A | 6/2007 |
| JP | 4098577 B2 | 6/2008 |
| JP | 4138797 B2 | 8/2008 |
| JP | 2009-165992 A | 7/2009 |
| JP | 2011-056414 A | 3/2011 |
| JP | 2011-131138 A | 7/2011 |
| JP | 4977225 B2 | 7/2012 |
| JP | 2013-059742 A | 4/2013 |
| JP | 2013-136031 A | 7/2013 |
| JP | 5259562 B2 | 8/2013 |
| JP | 5575078 B2 | 8/2014 |
| WO | WO 2004/033375 A1 | 4/2004 |
| WO | WO 2008/057981 A3 | 5/2008 |

OTHER PUBLICATIONS

Notice of Reasons for Rejection dated Apr. 10, 2014 in Japanese Application No. 2013-188747, 13 pgs.
Official Action from the Canadian Patent Office dated May 29, 2013 regarding Canadian Pat. App. No. 2,784,379 in 4 Pages.
First Office Action from the China Patent Office dated Oct. 29, 2013, regarding Chinese Pat. App. No. 201210270200.X in 24 pages.
Notice of Reasons for Refusal dated Mar. 3, 2014 in Japanese Patent Application No. 2011-201839 in five (5) pages.
Office Action mailed by Canadian Patent Office on May 10, 2013 in the Canadian patent application No. 2,784,380 in 4 pages.
Notification of the First Office Action mailed on Sep. 23, 2013 by State Intellectual Property Office of the People's Republic of China in the Chinese patent application No. 201210268511.2 in 19 pages.
Notification of the Second Office Action mailed by State Intellectual Property Office of the People's Republic of China on Apr. 28, 2014 in the Chinese patent application No. 201210268511.2—23 pages.

* cited by examiner

ULTRAVIOLET IRRADIATION APPARATUS

CROSS-REFERENCE TO RELATED APPLICATIONS

This application is national stage application of International Application No. PCT/JP2014/056457, filed Mar. 12. 2014, which designates the United States, incorporated herein by reference, and which is based upon and claims the benefit of priority from Japanese Patent Application No. 2013-188747, filed Sep. 11, 2013, the entire contents of which are incorporated herein by reference.

FIELD

Embodiments described herein relate generally to an ultraviolet irradiation apparatus.

BACKGROUND

Conventionally, there has been known an ultraviolet irradiation apparatus that includes: a treatment tank through which treated water passes; a UV irradiation member that is provided inside the treatment tank and irradiates treated water passing through the inside of the treatment tank with UV light; and a UV sensor that is provided inside the treatment tank and measures a dose of UV irradiation from the UV irradiation member.

In such a conventional UV irradiation apparatus as described above, air (air bubbles) contained in treated water may accumulate inside (in a top part of) the treatment tank when the treated water passes through the inside of the treatment tank. When such accumulation has occurred, a UV light receiving surface of the UV sensor may be exposed in air as a result of accumulation of air between the UV sensor and the UV irradiation member. Consequently, the accuracy of UV irradiation dose measurement performed by the UV sensor is possibly impaired.

An ultraviolet (UV) irradiation apparatus according to an embodiment comprises a treatment tank, a UV irradiation member, a UV sensor, and an air outlet unit. The treatment tank comprises a water supply opening to supply therethrough treated water to be further treated and a water drainage opening to drain therethrough the treated water. The UV irradiation member is provided inside the treatment tank and irradiates the treated water with UV light when the treated water passes through inside of the treatment tank. The UV sensor is provided inside the treatment tank and measures a dose of UV irradiation from the UV irradiation member. The air outlet unit is connected to an air outlet hole provided at a position higher than a horizontal plane passing through the UV sensor, and is provided to release, to outside of the treatment tank, through the air outlet hole, air that accumulates inside the treatment tank when the treated water passes through the inside of the treatment tank.

DETAILED DESCRIPTION

According to an embodiment, an ultraviolet (UV) irradiation apparatus comprises a treatment tank, a UV irradiation member, a UV sensor, and an air outlet unit. The treatment tank comprises a water supply opening to supply therethrough treated water to be further treated and a water drainage opening to drain therethrough the treated water. The UV irradiation member is provided inside the treatment tank and irradiates the treated water with UV light when the treated water passes through inside of the treatment tank. The UV sensor is provided inside the treatment tank and measures a dose of UV irradiation from the UV irradiation member. The air outlet unit is connected to an air outlet hole provided at a position higher than a horizontal plane passing through the UV sensor, and is provided to release, to outside of the treatment tank, through the air outlet hole, air that accumulates inside the treatment tank when the treated water passes through the inside of the treatment tank.

Based on the drawings, the following describes embodiments.

(First Embodiment)

First, one example of tap water treatment procedure to be performed by a tap water treatment system including an ultraviolet (UV) irradiation apparatus 100 according to a first embodiment (refer to FIG. 2 to FIG. 4) is described with reference to FIG. 1.

Figure 1:
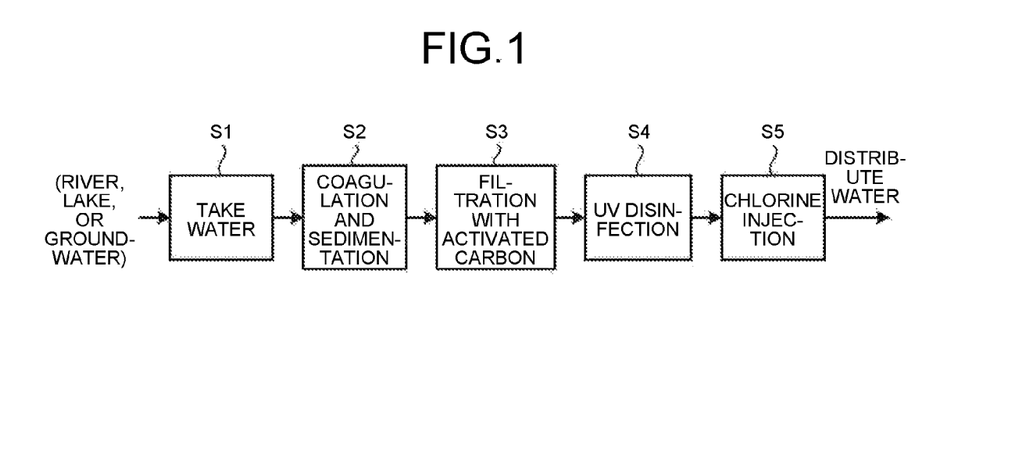
FIG. 1 is an exemplary flowchart illustrating a procedure of tap water treatment using a tap water treatment system including an ultraviolet (UV) irradiation apparatus according to a first embodiment.

In this tap water treatment system, at Step S1, raw water is taken from a river, a lake, groundwater, or the like, as illustrated in FIG. 1. Step S2 then follows this step.

Subsequently, at Step S2, raw water taken in through the above process at Step S1 is introduced into a coagulation sedimentation tank, and a coagulant is added to the introduced raw water. Step S3 then follows this step.

Subsequently, at Step S3, supernatant water in the raw water subjected to the above process (a coagulation sedimentation process) at Step S2 is transported into an activated-carbon filtration tank, and foreign substances are removed from the supernatant water. Step S4 then follows this step.

Subsequently, at Step S4, the filtered water subjected to the above process (an activated-carbon filtration process) at Step S3 (treated water W; refer to FIG. 3 and FIG. 4) is transported into the UV irradiation apparatus 100, and sterilization, disinfection, decoloring, and the like using UV light are performed on the treated water W. Step S5 then follows this step.

Subsequently, at Step S5, the treated water W subjected to the above process (a UV disinfection process) at Step S4 (UV disinfection treated water W) is transported into a chlorine injection tank, and chlorine is injected into the UV disinfection treated water W. The treated water W subjected to the process (a chlorine injection. process) at Step S5 is distributed to homes and offices.

Next, one example of a configuration of the UV irradiation apparatus 100 according to the first embodiment is described with reference to FIG. 2 to FIG. 4.

Figure 2:
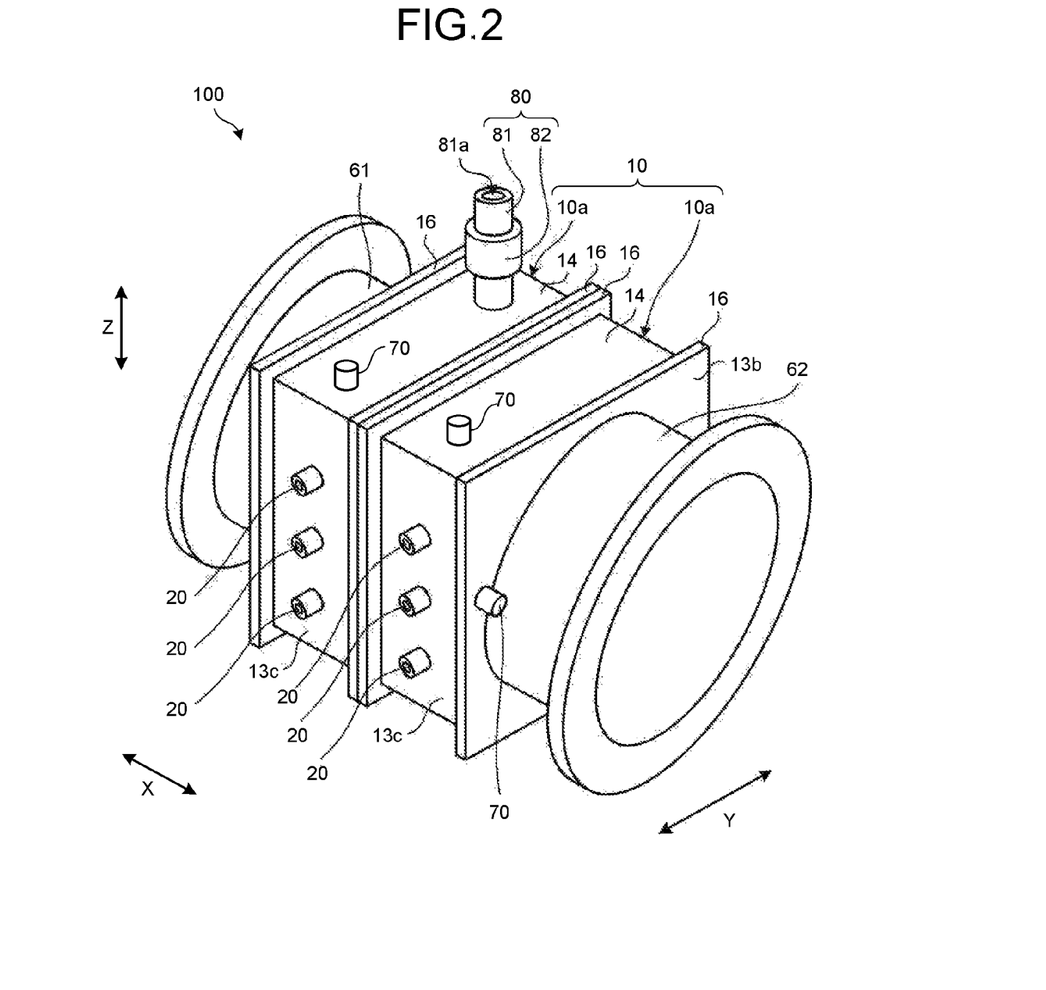
FIG. 2 is an exemplary perspective view illustrating the outside appearance of the UV irradiation apparatus according to the first embodiment.
Figure 3:
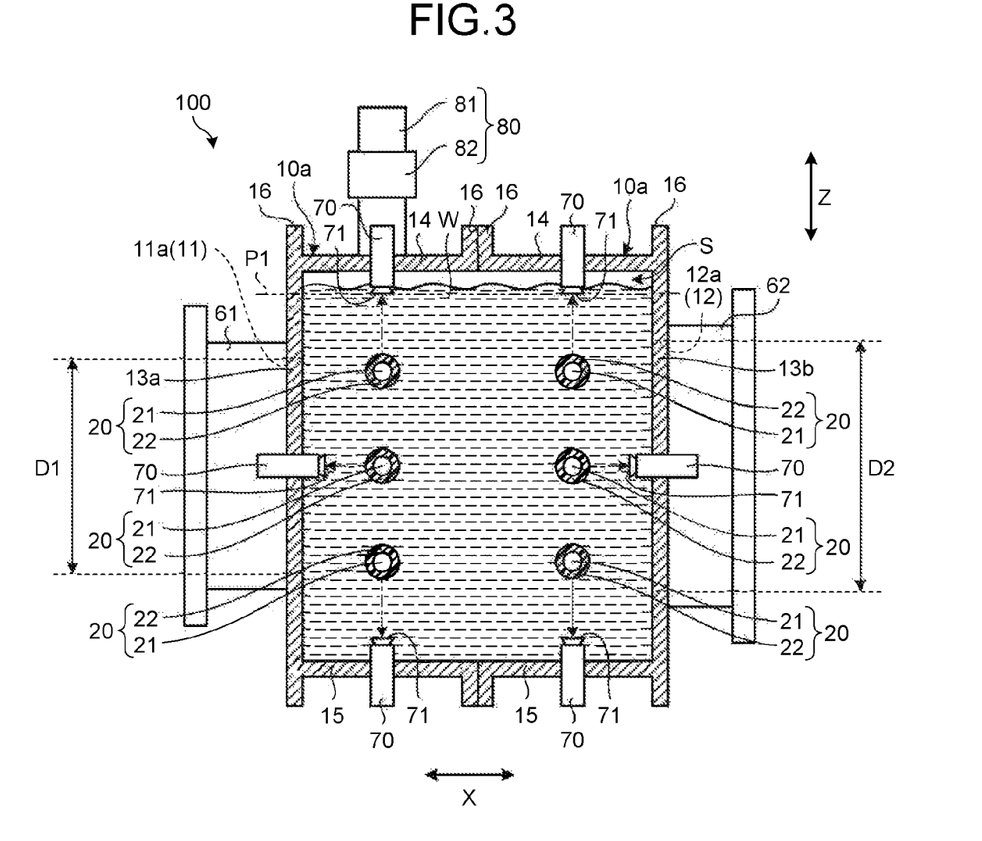
FIG. 3 is an exemplary cross-sectional view of the UV irradiation apparatus illustrated in FIG. 2, taken along an X-Z plane, according to the first embodiment.
Figure 4:
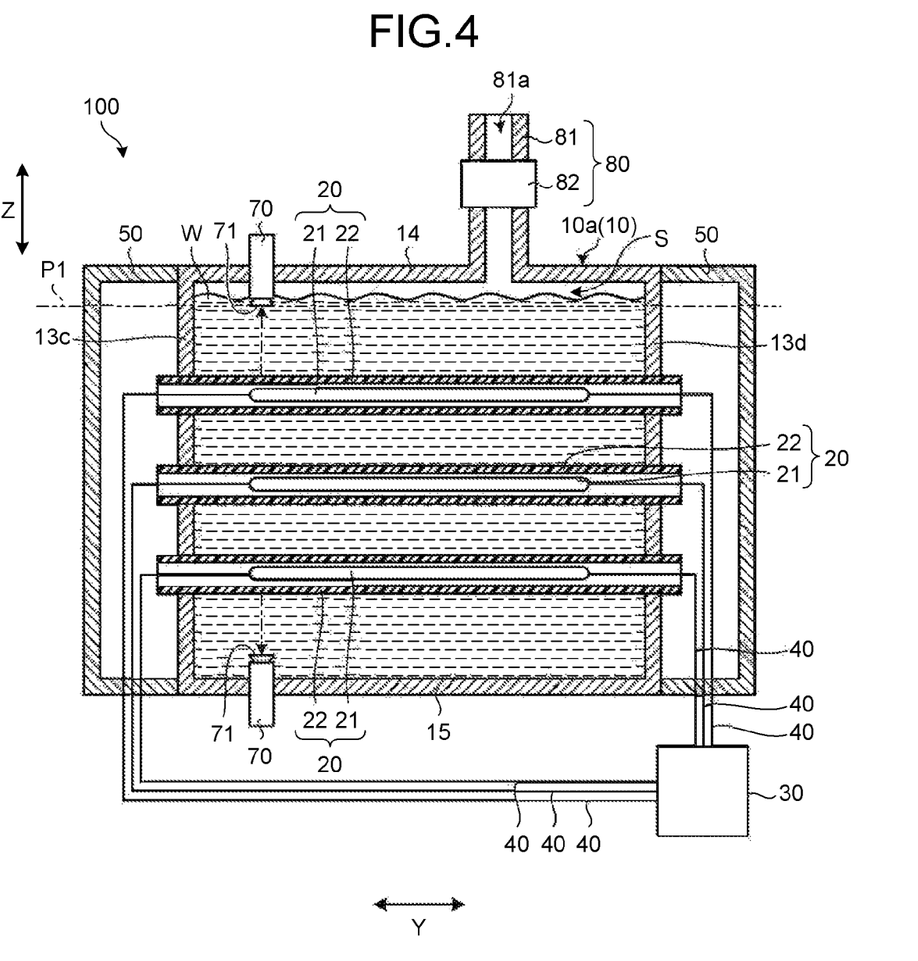
FIG. 4 is an exemplary cross-sectional view of the UV irradiation apparatus illustrated in FIG. 2, taken along a Y-Z plane, according to the first embodiment.

As illustrated in FIG. 2 to FIG. 4, the UV irradiation apparatus 100 includes a treatment tank (a reaction tank, or reactor) 10 to temporarily store the treated water W to be further treated (refer to FIG. 3 and FIG. 4), and a plurality of (in the first embodiment, six) UV irradiation members 20 to irradiate the treated water W stored inside the treatment tank 10 with UV light. The treatment tank 10 has a hollow rectangular parallelepiped shape (box shape) that is dividable into two tank parts 10a. FIG. 3 is a cross-sectional view of the UV irradiation apparatus 100 illustrated in FIG. 2, taken along an X-Z plane that passes through UV monitors 70 to be described later. FIG. 4 is another cross-sectional view of the UV irradiation apparatus 100 illustrated in FIG. 2, taken along a Y-Z plane that passes through an air outlet unit 80 to be described later.

As illustrated in FIG. 3, the treatment tank 10 includes a water supply opening 11 to supply the treated water W therethrough, and a water drainage opening 12 to drain the treated water W therethrough after the treatment is performed thereon. The water supply opening 11 and the water drainage opening 12 are provided in opposite surface parts of the treatment tank 10 (side surface parts 13a and 13b facing each other in a certain direction (the X direction) within a horizontal plane). Specifically, the water supply opening 11 is provided around the central part of the side surface part 13a of the tank part 10a, which is positioned in the left-hand side of the illustration in FIG. 3. The water drainage opening 12 is provided around the central part of the side surface part 13b of the tank part 10a, which is positioned in the right-hand side of the illustration in FIG. 3.

Additionally, ribs 16 to prevent the treatment tank 10 from being deformed with an increase in pressure inside the treatment tank 10 are provided to the treatment tank 10. These ribs 16 are provided on surface parts of the treatment tank 10 (the tank parts 10a) other than the side surface parts 13a and 13b (i.e., on side surface parts 13c and 13d, an upper surface part 14, and a lower surface part 15). Specifically, the ribs 16 are provided at the left end of the tank part 10a positioned in the left-hand side of the illustration in FIG. 3, at the right end of the tank part 10a positioned in the right-hand side of the illustration in FIG. 3, and at the boundary portions of these two tank parts 10a (the central portion of the treatment tank 10 as a whole in the left-to-right direction thereof (the X-direction)).

As illustrated in FIG. 2 to FIG. 4, the UV irradiation members 20 are arranged apart from one another. Specifically, as illustrated in FIG. 3, the UV irradiation members 20 are provided in pairs aligned vertically (in the Z direction) inside the treatment tank 10. The UV irradiation members 20 thus provided in each pair are arranged apart from each other in the left-to-right direction (the X direction).

As illustrated in FIG. 4, each of the UV irradiation members 20 is provided so as to linearly extend in a direction (the Y direction) perpendicular to the X direction within a horizontal plane. Each of the UV irradiation members 20 includes a UV lamp 21 that irradiates a target with UV light, and a tubular protective tube 22 covering the UV lamp 21, The protective tube 22 is made of a material that transmits UV light. For example, the protective tube 22 is made of a transparent dielectric material such as silica glass.

The opposite ends of the respective UV lamps 21 in the Y direction are connected via wiring 40 to an electronic ballast 30 provided outside the treatment tank 10. The electronic ballast 30 is a piece of equipment that supplies power to the UV lamps 21 and maintains the stability of electrical discharge. The opposite ends of the respective protective tubes 22 in the Y direction are provided so as to project outward from the side surface parts 13c and 13d of the treatment tank 10. Furthermore, portions of the protective tubes 22 that project from the treatment tank 10 are covered with covering members 50 attached to the respective opposite ends in the Y direction of the treatment tank 10. Each of the covering members 50 has functions such as a light blocking function, an electric shock prevention function, an electromagnetic shield function, and a dew condensation prevention function. Illustration of the covering members 50 is omitted from FIG. 2.

Here, in the first embodiment, the water supply opening 11 and the water drainage opening 12, which are provided in the respective side surface parts 13a and 13b of the treatment tank 10, have different inner diameters. Specifically, as illustrated in FIG. 3, the inner diameter D1 of the water supply opening 11 is smaller than the inner diameter D2 of the water drainage opening 12. As illustrated in FIG. 2 and FIG. 3, a water supply port 61 and a water drainage port 62 in cylindrical shapes linearly extending in the X direction are connected to the water supply opening 11 and the water drainage opening 12, respectively, This structure causes the treated water W to pass through the inside of the treatment tank 10 from the water supply opening 11 (the water supply port 61) toward the water drainage opening 12 (the water drainage port 62) (in the X direction).

Furthermore, in the first embodiment, UV monitors 70 and the air outlet unit (air outlet port) 80 are provided to the upper surface part 14 of the treatment tank 10 (the tank parts 10a). Specifically, the respective UV monitors 70 are provided in parts of the upper surface part 14 that correspond to the respective two tank parts 10a included in the treatment tank 10. The air outlet unit 80 is provided to a part of the upper surface part 14 that corresponds to the tank part 10a positioned in the left-hand side of the illustration in FIG. 3. Additionally, the other UV monitors 70 are provided in the surface parts of the treatment tank 10 other than the upper surface part 14 (i.e., in the lower surface part 15 and the side surface parts 13a and 13b).

The UV monitors 70 are provided to monitor the dose of UV irradiation from the UV irradiation members 20. A plurality of (in the first embodiment, six) UV monitors 70 are provided so as to correspond to the respective six UV irradiation members 20 provided inside the treatment tank 10. These six UV monitors 70 are provided so as to linearly extend from the surface parts of the treatment tank 10 toward the respective UV irradiation members 20.

Specifically, as illustrated in FIG. 3, two UV monitors 70 of the six UV monitors 70 are provided in such a manner as to extend downward from the upper surface part 14 of the treatment tank 10 (the tank parts 10a), so as to correspond to two UV irradiation members 20 arranged in an upper inside region of the treatment tank 10, respectively. Other two UV monitors 70 of the six UV monitors 70 are provided in such a manner as to extend upward from the lower surface part 15 of the treatment tank 10, so as to correspond to two UV irradiation members 20 arranged in a lower inside region of the treatment tank 10, respectively. The remaining two UV monitors 70 of the six UV monitors 70 are provided in such a manner as to extend inward from the side surface parts 13a and 13b of the treatment tank 10, so as to correspond to two UV irradiation members 20 arranged in a vertically central inside region of the treatment tank 10, respectively.

UV sensors 71 that receive UV light (refer to arrowed chain lines in FIG. 3 and FIG. 4) from the UV irradiation members 20 and measure the dose of UV irradiation are provided on front ends of the respective UV monitors 70 that face the UV irradiation members 20. These UV sensors 71 are provided so as to face UV irradiation surfaces of the respective UV irradiation members 20 (i.e., the outer circumferential surfaces of the respective protective tubes 22). Specifically, the UV sensors 71 are provided so as to face the central portions of the respective UV lamps 21. Furthermore, each of the UV sensors 71 is provided apart from the UV irradiation surface of a UV receiving surface of the corresponding UV irradiation member 20 with a certain distance therebetween.

Here, the air outlet unit 80 is provided in the upper surface part 14 of the treatment tank 10. Specifically, the air outlet unit 80 is connected to an air outlet hole 81a provided at a position higher than a horizontal plane P1 (refer to FIG. 3 and FIG. 4) that passes through UV light receiving surfaces (the lower surfaces) of the UV sensors 71 of the UV monitors 70 that are provided in the upper surface part 14 of the treatment tank 10. This air outlet hole 81a is provided to release, to the outside of the treatment tank 10, air in an air layer S (refer to FIG. 3 and FIG. 4) that accumulates inside (between the upper surface part 14 and the water surface of the treated water W in) the treatment tank 10 when the treated water W passes through the inside of the treatment tank 10. The air outlet hole 81a is provided at a position higher than an upper end 11a of the water supply opening 11 and higher than an upper end 12a of the water drainage opening 12. When the treated water W passes through the inside of the treatment tank 10 from the water supply opening 11 toward the water drainage opening 12, this structure can prevent flow of the treated water W from being hindered by a member (such as a cylindrical member 81 to be described later) configuring the air outlet hole 81a.

As illustrated in FIG. 2 to FIG. 4, the air outlet unit 80 includes: the cylindrical member 81 that has an inner circumferential surface configuring the air outlet hole 81a; and a valve 82 that blocks the air outlet hole 81a in such a manner that allows opening and closing of the air outlet hole 81a. The cylindrical member 81 is provided so as to linearly extend upward from the upper surface part 14 of the treatment tank 10. The valve 82 is provided in the central portion of the cylindrical member 81 in the Z direction. The valve 82 is made of a manual valve, which is manually opened and closed by a user (such as a worker of a waterworks bureau). Here, the valve 82 is one example of a "valve member".

As described above, in the first embodiment, the air outlet hole 81a is provided at a position higher than the horizontal plane P1 passing through the UV light receiving surfaces of the UV sensors 71. Furthermore, the air outlet unit 80, which is used to release therethrough, to the outside of the treatment tank 10, air (the air layer S) that accumulates in the top part of the treatment tank 10 when the treated water W passes through the inside of the treatment tank 10, is connected to the air outlet hole 81a. This structure enables reduction of the volume (the thickness) of the air layer S inside the treatment tank 10 through the air outlet unit 80, thereby it is possible to prevent the water surface of the treated water W from becoming lower than the UV light receiving surfaces of the UV sensors 71. Consequently, it is possible to prevent air from accumulating between the UV sensors 71 and the UV irradiation members 20, thereby the UV light receiving surfaces of the UV sensors 71 can be kept from being exposed in air and kept submerged, and the accuracy of UV irradiation dose measurement performed by the UV sensors 71 can be kept from being impaired.

In particular, in a structure (what is called a different-diameter piping structure), such as the one in the first embodiment, in which the water supply opening 11 and the water drainage opening 12 provided to the treatment tank 10 have different inner diameters, the air layer S tends to be formed inside the treatment tank 10 because the treated water W has a lower flow rate inside the treatment tank 10 and therefore stays longer than otherwise inside the treatment tank 10. Despite this structure, in the first embodiment, the volume (the thickness) of the air layer S inside the treatment tank 10 can be reduced by the air outlet unit 80, thereby it is possible to effectively prevent air from accumulating between the UV sensors 71 and the UV irradiation members 20. Thus, the accuracy of the UV irradiation dose measurement can be effectively kept from being impaired, thereby readings of the UV monitors 70 (measurement values of the dose of UV irradiation) can be stabilized as depicted in a part at and after a time point τ of a graph in FIG. 5 to be described below.

Figure 5:
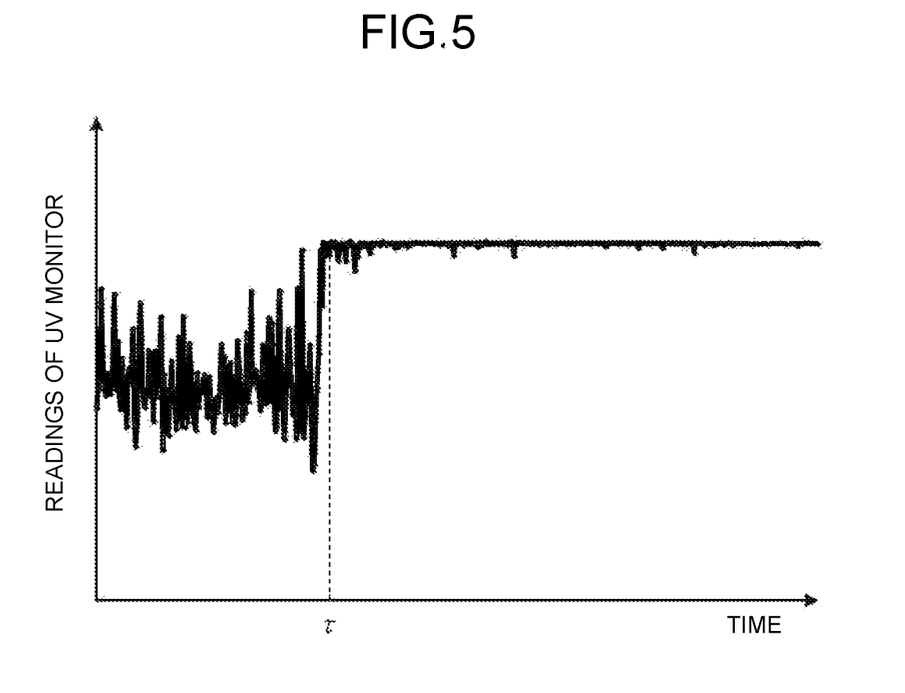
FIG. 5 is an exemplary schematic graph for explaining effects of providing an air outlet unit to the UV irradiation apparatus according to the first embodiment.

Next, effects of providing the air outlet unit 80 to the UV irradiation apparatus 100 according to the first embodiment are described with reference to FIG. 5. FIG. 5 is a graph depicting readings of one of the UV monitors 70 without air in the air layer S being released through the air outlet unit 80 (before the time τ) and readings of the UV monitor 70 with air in the air layer S being released through the air outlet unit 80 (at and after the time point τ).

As depicted in FIG. 5, before the time τ, air in the air layer S was not released and the UV sensor 71 was sometimes exposed in air, thereby the readings of the UV monitor 70 were unstable. In contrast, at and after the time τ, air from the air layer S was released and the UV sensor 71 was hence kept submerged, thereby the readings of the UV monitor 70 were large and stable.

Meanwhile, the dose of UV irradiation from the UV irradiation members 20 are determined by feeding back readings of the UV monitors 70. For example, when readings of a specific one of the UV monitors 70 are small and unstable, it is determined that the dose of UV irradiation from the corresponding UV irradiation member 20 is insufficient, and the dose of UV irradiation from the UV irradiation member 20 is then controlled so as to be higher. However, even if it has been determined that the dose of UV irradiation from a specific one of the UV irradiation members 20 is insufficient, there may be a case where the dose of UV irradiation from the UV irradiation member 20 is actually sufficient. In this case, it is not needed to control the dose of UV irradiation from the UV irradiation member 20 so as to be higher. That is, as depicted in FIG. 5, even if readings of any of the UV monitors 70 are small and unstable (refer to the part of the graph before the time τ in FIG. 5), there may be a case where readings of the UV monitor 70 become large and stable when the corresponding UV sensor 71 is submerged with air being released from the air layer S through the air outlet unit 80 (refer to the part of the graph at and after the time τ in FIG. 5) In this case, it is not needed to control the dose of UV irradiation from the UV irradiation member 20 so as to be higher.

In consideration of the possibility as described above, it is needed to increase the accuracy of UV irradiation dose measurement performed by the UV sensors 71 in order to avoid such a malfunction (erroneous control) of the UV irradiation apparatus 100 as to set the dose of UV irradiation from the UV irradiation members 20 unnecessarily high. For this reason, in the first embodiment, the air outlet unit 80 is provided to the treatment tank 10, so that the accuracy of UV irradiation dose measurement performed by the UV sensors 71 is kept from being impaired. According to the first embodiment, malfunctions of the UV irradiation apparatus 100 can be thus avoided.

(First Modification)

For the above-described first embodiment, an exemplary case is described in which the air outlet unit 80 is configured with the manual valve 82 that is manually opened and closed by a user (a worker of a waterworks bureau). However, as in the case of a first modification illustrated in FIG. 6, an air outlet unit 180 can be alternatively configured with an electromagnetic valve 182 that automatically opens and closes the air outlet hole 81*a* under the control of a controller 182*b*. The electromagnetic valve 182 is one example of the "valve member".

Figure 6:
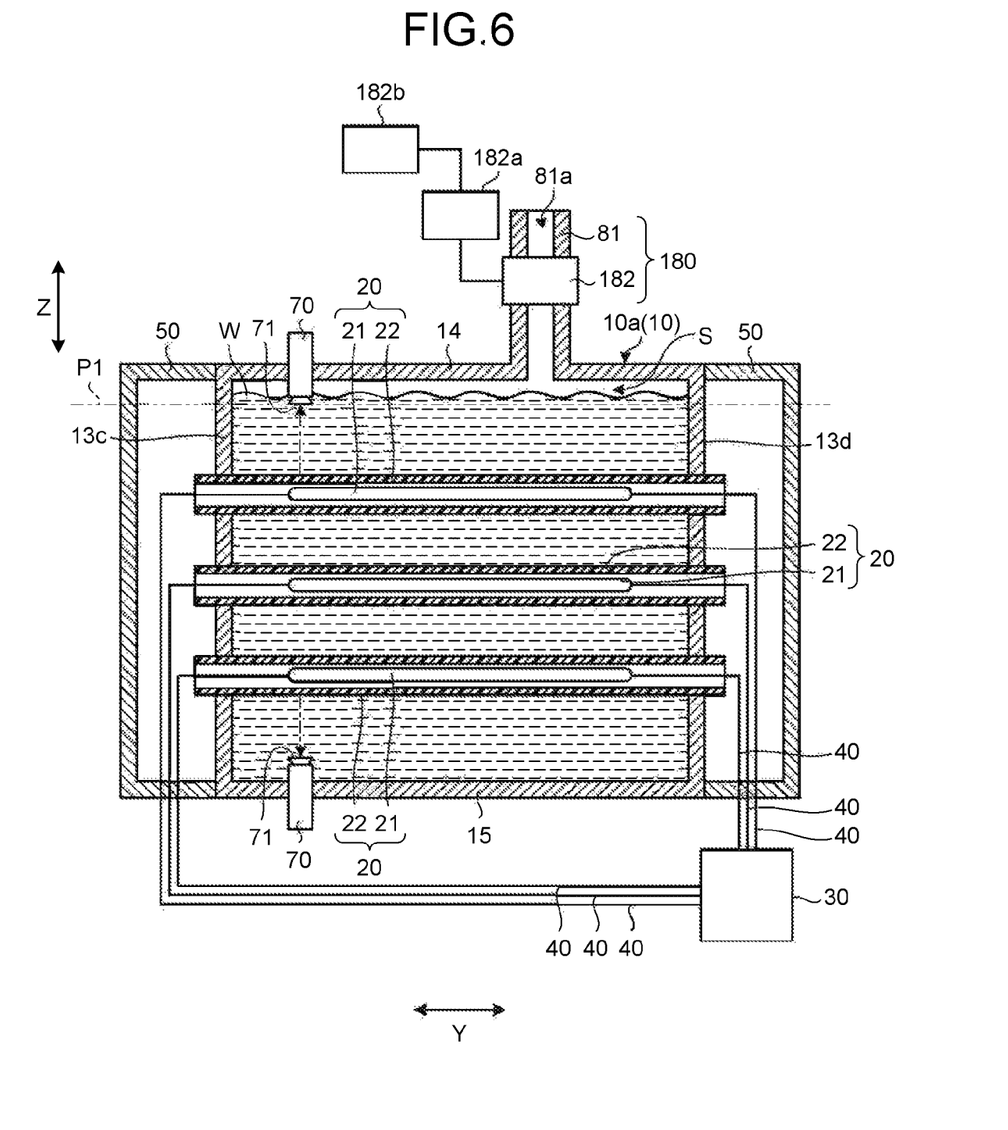
FIG. 6 is an exemplary cross-sectional view illustrating a UV irradiation apparatus according to a first modification.

In this first modification, as illustrated in FIG. 6, a valve driver 182*a* including a motor that drives the electromagnetic valve 182 is connected to the electromagnetic valve 182. A controller 182*b* that controls the valve driver 182*a* is connected to the valve driver 182*a*. This controller 182*b* is configured to control the electromagnetic valve 182 to cause the valve driver 182*a* to regularly open and close the air outlet hole 81*a* at certain time intervals. This modification can thus regularly and automatically release air that has accumulated inside the treatment tank 10.

(Second Modification)

Figure 7:
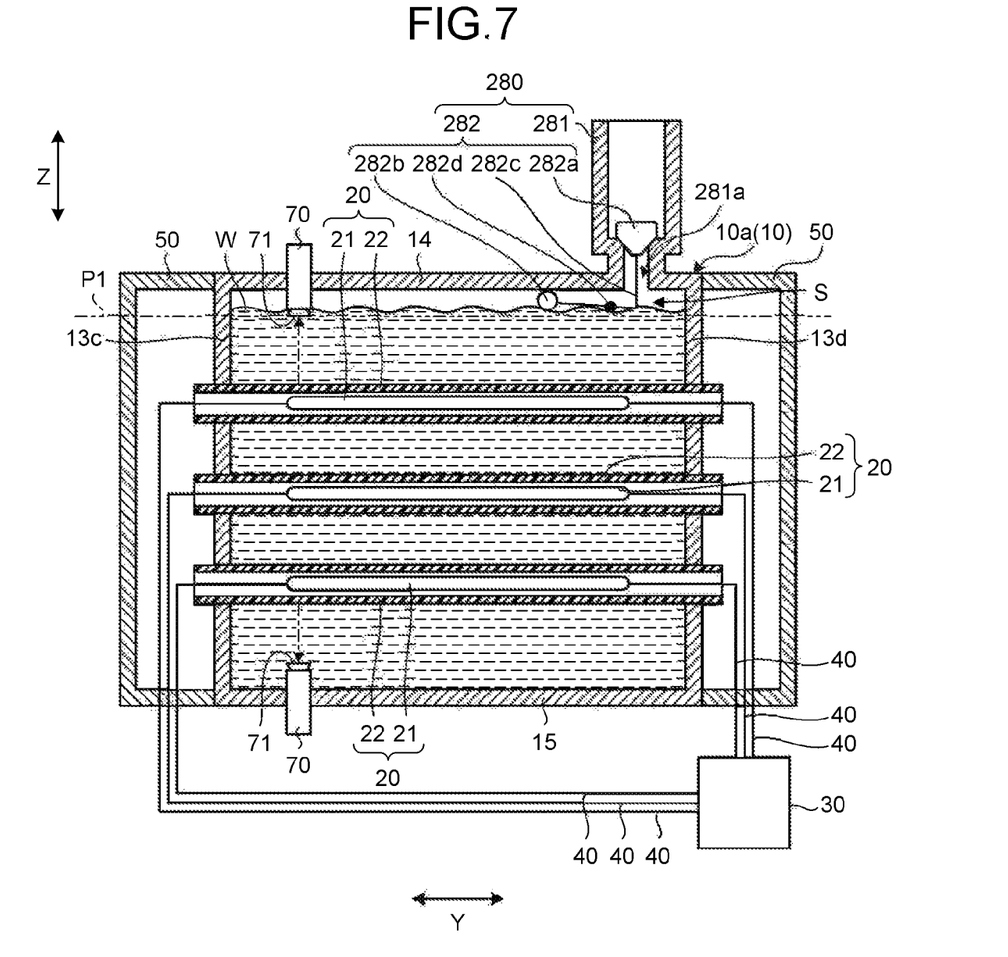
FIG. 7 is an exemplary cross-sectional view illustrating a UV irradiation apparatus according to a second modification.

Alternatively, as in the case of a second modification illustrated in FIG. 7, an air outlet unit 280 can be configured with a float-type valve member 282, In this second modification, as illustrated in FIG. 7, the air outlet unit 280 includes: a cylindrical member 281 that has the inner circumferential surface configuring an air outlet hole 281*a*; and the float-type valve member 282. The valve member 282 includes: a valve part 282*a* that blocks the air outlet hole 281*a* in a manner that allows opening and closing of the air outlet hole 281*a*; and a float part 282*b* connected to the valve part 282*a*. The valve part 282*a* and the float part 282*b* are connected to each other with an arm part 282*c* therebetween that rotates (swings) about a fulcrum part 282*d* fixed inside the treatment tank 10.

Here, in the second modification, when the water surface of the treated water W lowers as a result of an increase in volume (thickness) of the air layer S having accumulated inside the treatment tank 10, the float part 282*b* floating on the water surface of the treated water W lowers correspondingly. Consequently, the arm part 282*c* connected to the float part 282*b* rotates about the fulcrum part 282*d*, so that one end of the arm part 282*c* opposite to the end connected to the float part 282*b* rises. As a result, the valve part 282*a* connected to the end of the arm part 282*c* opposite to the end connected to the float part 282*b* rises, so that the air outlet hole 281*a* is opened. Thus, the valve part 282*a* is configured to open the air outlet hole 281*a* by rising as the float part 282*b* lowers.

In the second modification, when the water surface of the treated water W rises as a result of a decrease in volume (thickness) of the air layer S having accumulated inside the treatment tank 10, the float part 282*b* floating on the water surface of the treated water W rises correspondingly. Consequently, the arm part 282*c* connected to the float part 282*b* rotates about the fulcrum part 282*d*, so that the end of the arm part 282*c* opposite to the end connected to the float part 282*b* lowers. As a result, the valve part 282*a* connected to the end of the arm part 282*c* opposite to the end connected to the float part 282*b* lowers, so that the air outlet hole 281*a* is closed. Thus, the valve part 282*a* is configured to close the air outlet hole 281*a* by lowering as the float part 282*b* rises.

As described above, in the second modification, the air outlet hole 281*a* can be appropriately opened and closed in response to rising and lowering of the water surface of the treated water W by use of the float-type valve member 282. Consequently, it is possible to appropriately release air from inside the treatment tank 10. That is, it is possible to effectively prevent air from accumulating between the UV sensors 71 and the UV irradiation members 20.

(Third Modification)

Figure 8:
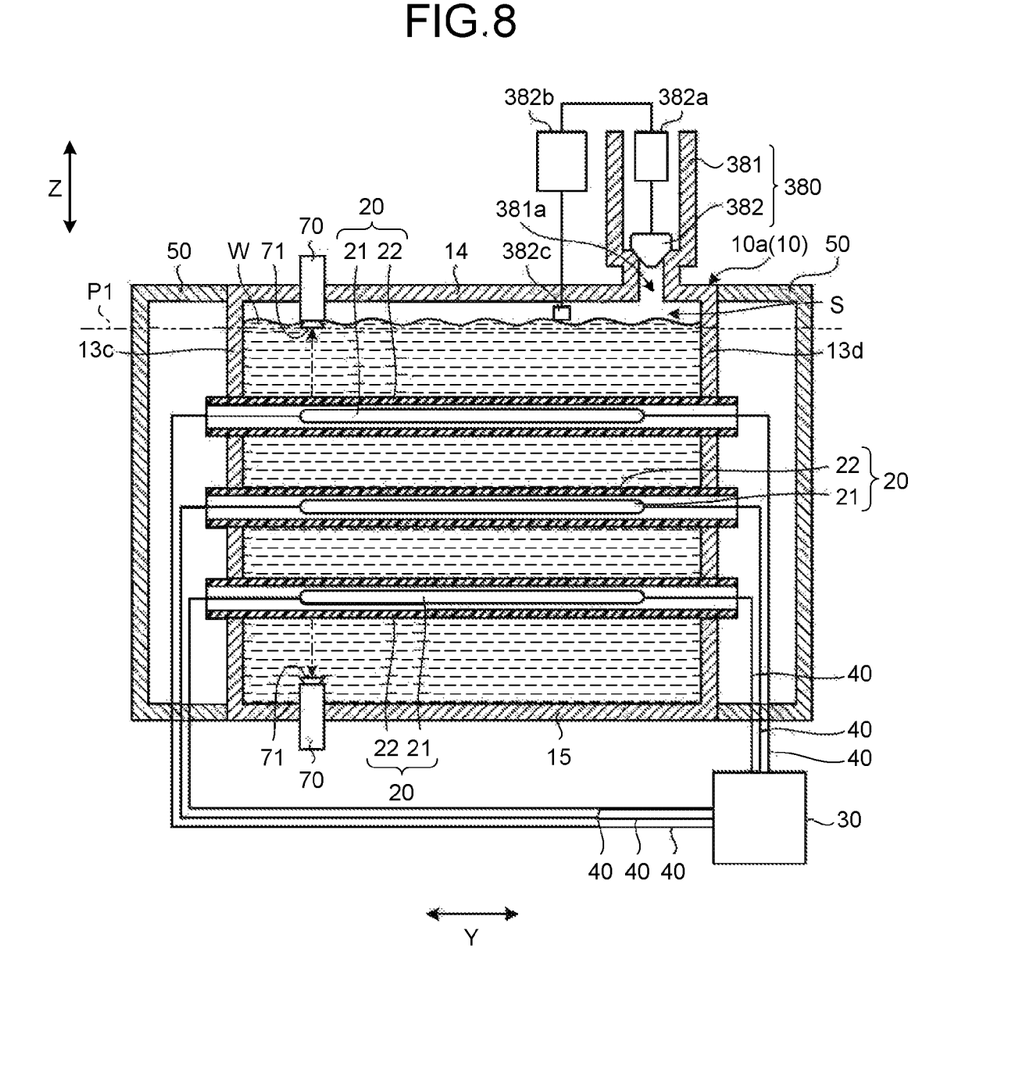
FIG. 8 is an exemplary cross-sectional view illustrating a UV irradiation apparatus according to a third modification.

Alternatively, as in the case of a third modification illustrated in FIG. 8, a sensor part 382*c* that measures the vertical position of the water surface of the treated water W passing through the inside of the treatment tank 10 can be provided to enable opening and closing of a valve member 382 of an air outlet unit 380 to be controlled based on a measurement result from the sensor part 382*c*. The sensor part 382*c* is one example of a "measurement unit".

That is, in the third modification, on the water surface of the treated water W passing through the inside of the treatment tank 10, the float-type sensor part 382*c* floats that measures the distance between the upper surface part 14 of the treatment tank 10 and the water surface of the treated water W (the thickness of the air layer S) by measuring the vertical position of the water surface of the treated water W passing through the inside of the treatment tank 10. Furthermore, a valve driver 382*a* including a motor that drives the valve member 382 is connected to the valve member 382 configured to open and close an air outlet hole 381*a* that is configured by the inner circumferential surface of a cylindrical member 381. A controller 382*b* that controls the valve driver 382*a* is connected to the valve driver 382*a*.

Here, in the third modification, a controller 382*b* is connected to the sensor part 382*c*, and is configured to, based on a measurement result (the thickness of the air layer S) from the sensor part 382*c*, control the valve driver 382*a*. That is, the controller 382*b* is configured to, based on a measurement result (the thickness of the air layer S) from the sensor part 382*c*, control opening and closing of the valve member 382 so that the air outlet hole 381*a* can be opened before the water surface of the treated water W lowers below the horizontal plane P1 passing through the UV sensors 71.

According to the third modification, it is possible to open the air outlet hole 381*a* before the water surface of the treated water W lowers below the horizontal plane P1 passing through the UV sensors 71 because opening and closing of the valve member 382 is controlled based on a measurement result from the sensor part 382*c*. Therefore, it is possible to reliably prevent accumulation of air between each of the UV sensors 71 of the UV monitors 70 provided in the upper surface part 14 of the treatment tank 10 and the UV irradiation member 20 corresponding to that UV sensor 71.

(Fourth Modification)

Figure 9:
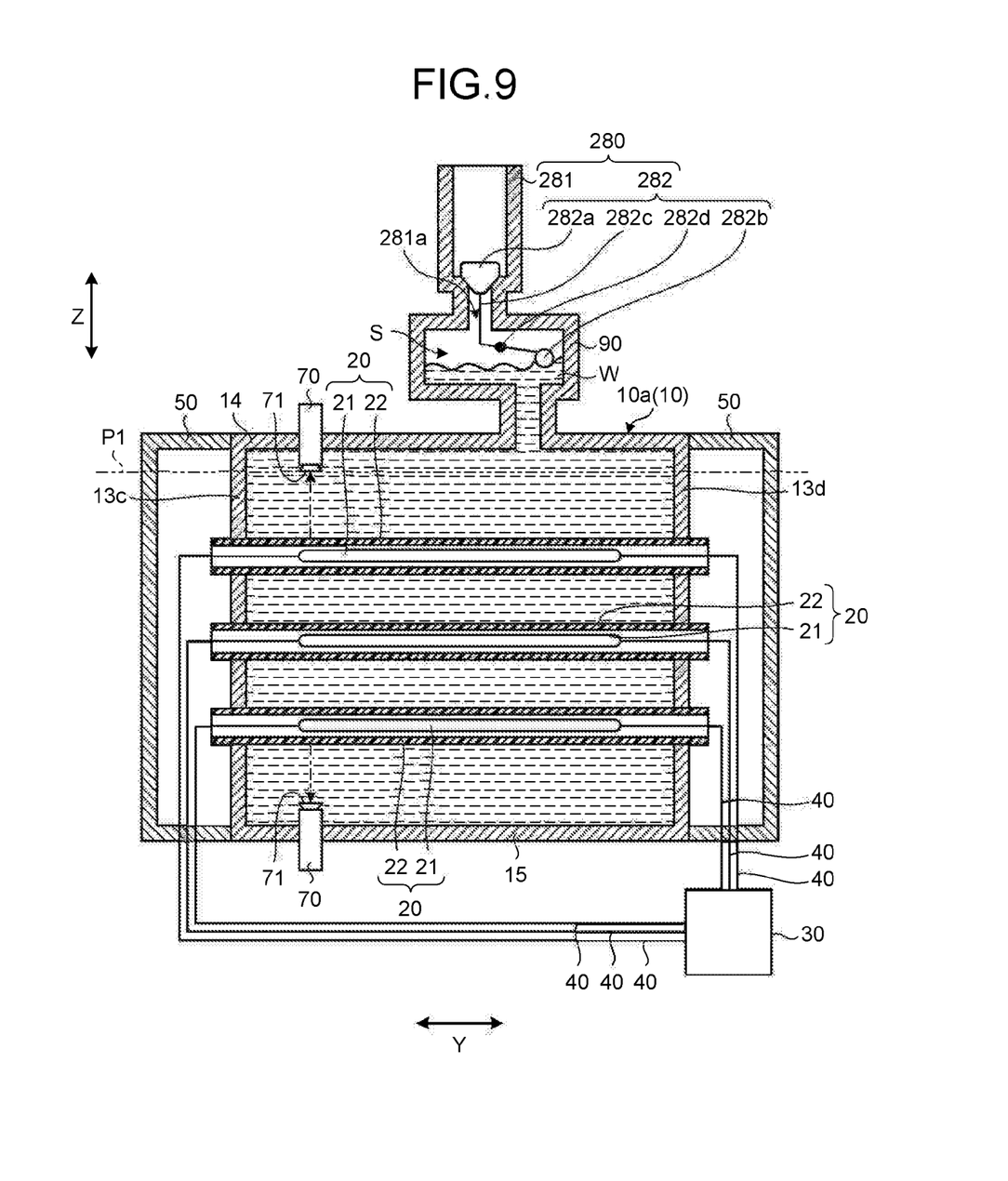
FIG. 9 is an exemplary cross-sectional view illustrating a UV irradiation apparatus according to a fourth modification.

Alternatively, as in the case of a fourth modification illustrated in FIG. 9, a buffer tank 90 that accommodates air that would otherwise accumulate inside the treatment tank 10 can be provided in a position higher than the upper end (the upper surface part 14) of the treatment tank 10. A detailed description of an air outlet unit 280 according to the fourth modification is omitted here because the air outlet unit 280 is the same as the equivalent part in the second modification described above.

That is, in the fourth modification, as illustrated in FIG. 9, the buffer tank 90 smaller than the treatment tank 10 is provided in a position higher than the upper end (the upper surface part 14) of the treatment tank 10 and in an intermediary portion of the air outlet hole 281a. This structure allows air to accumulate inside the buffer tank 90 before air accumulates inside the treatment tank 10, thereby it is possible to prevent air from accumulating between each of the UV sensors 71 of the UV monitors 70 provided in the upper surface part 14 of the treatment tank 10 and the UV irradiation member 20 corresponding to that UV sensor 71.

(Second Embodiment)

Next, one example of a configuration of a UV irradiation apparatus 200 according to a second embodiment is described with reference to FIG. 10 to FIG. 12. In this second embodiment, which is different from the above first embodiment and first to fourth modifications each including the treatment tank 10 having a hollow rectangular parallelepiped shape (box shape), an exemplary case including a treatment tank 210 having a hollow columnar shape (cylindrical shape) is described.

Figure 10:
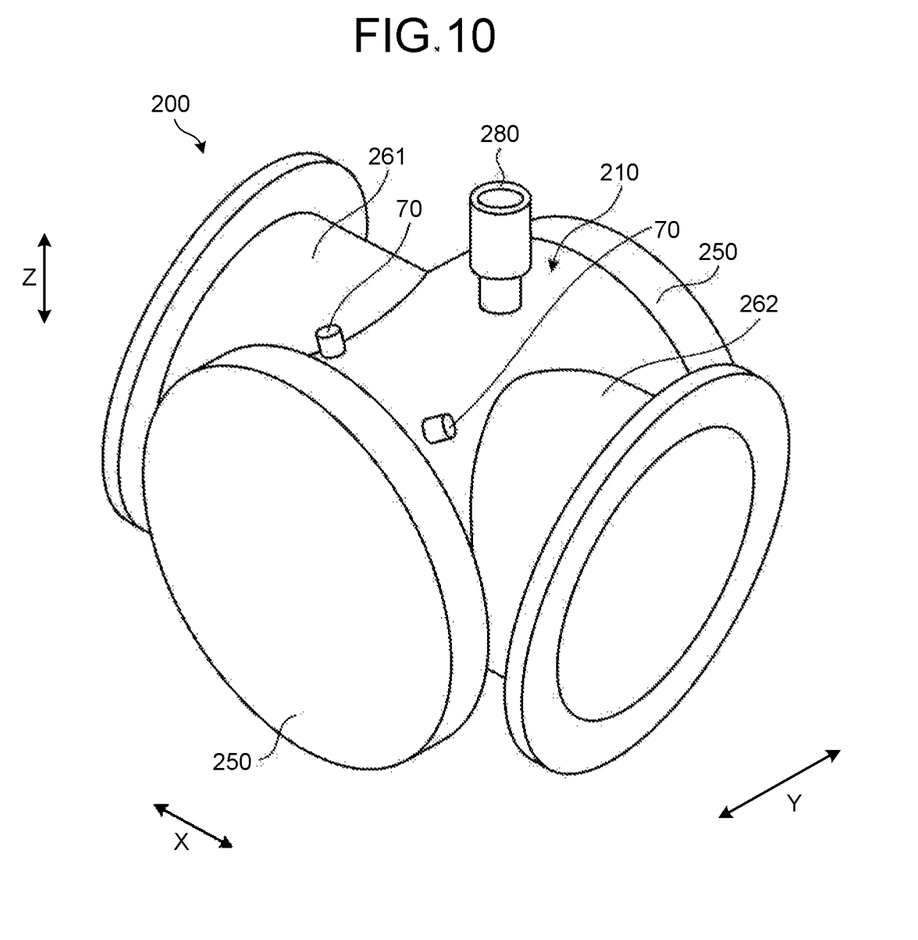
FIG. 10 is an exemplary perspective view illustrating the outside appearance of the UV irradiation apparatus according to a second embodiment.
Figure 11:
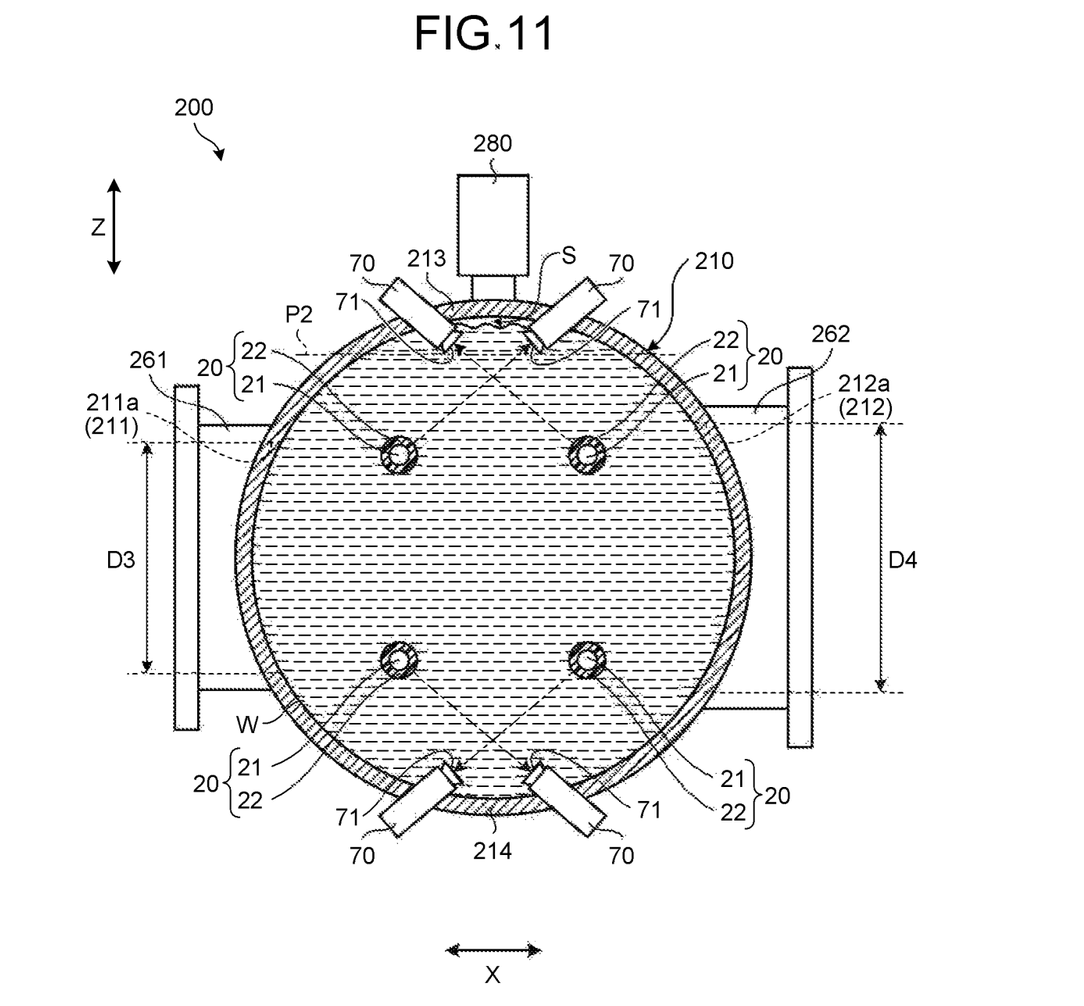
FIG. 11 is an exemplary cross-sectional view of the UV irradiation apparatus illustrated in FIG. 10, taken along an X-Z plane, according to the second embodiment.
Figure 12:
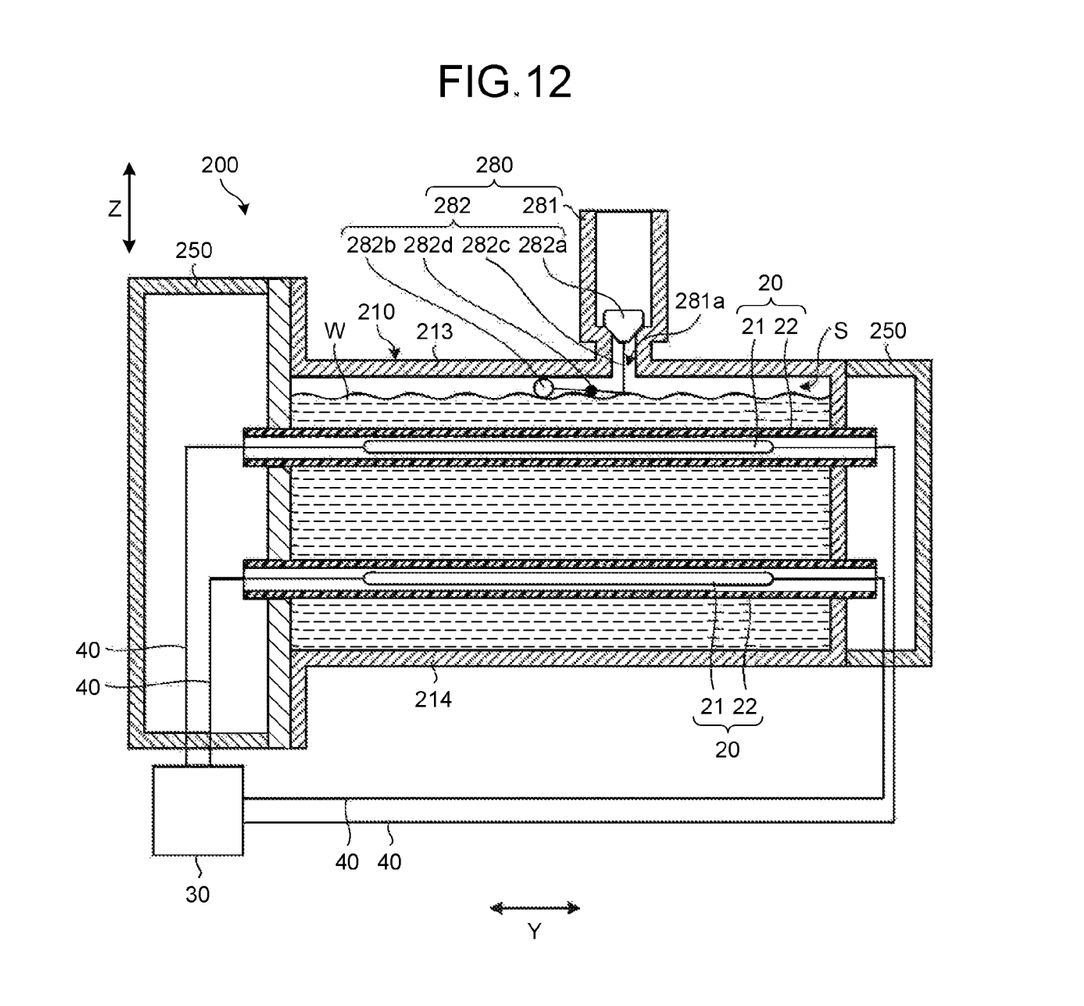
FIG. 12 is an exemplary cross-sectional view of the UV irradiation apparatus illustrated in FIG. 10, taken along a Y-Z plane, according to the second embodiment.

As illustrated in FIG. 10 to FIG. 12, the UV irradiation apparatus 200 according to the second embodiment includes the treatment tank 210 having a cylindrical shape extending in the Y direction, and a plurality of (in the second embodiment, four) UV irradiation members 20 extending in the Y direction. As illustrated in FIG. 10 and FIG. 12, covering members 250, which have functions such as a light blocking function, an electric shock prevention function, an electromagnetic shield function, and a dew condensation prevention function, are attached to the opposite ends in the Y direction of the treatment tank 210. FIG. 11 is a cross-sectional view of the UV irradiation apparatus 200 illustrated in FIG. 10, taken along an X-Z plane that passes through the UV monitors 70. FIG. 12 is another cross-sectional view of the UV irradiation apparatus 200 illustrated in FIG. 10, taken along a Y-Z plane that passes through the air outlet unit 280.

As illustrated in FIG. 11, a water supply opening 211 (with an inner diameter of D3) and a water drainage opening 212 (with an inner diameter of D4), which have different inner diameters, are provided in respective parts (side parts) of the treatment tank 210 that face each other in the X direction. A water supply port 261 and a water drainage port 262 in cylindrical shapes linearly extending in the X direction are connected to the water supply opening 211 and the water drainage opening 212, respectively.

The UV irradiation members 20 are arranged apart from one another. Specifically, as illustrated in FIG. 11, the UV irradiation members 20 are provided in pairs positioned in the upper region and the lower region, respectively, of the inside of the treatment tank 210. The UV irradiation members 20 thus provided in each pair are arranged apart from each other in the X direction.

Here, in the second embodiment, UV monitors 70 and the air outlet unit 280, which has the same structure as the one in the second modification, are provided in a top part 213 of the treatment tank 210. In addition to the UV monitors 70 provided in the top part 213 of the treatment tank 210, the other UV monitors 70 are provided in a bottom part 214 of the treatment tank 210.

As the UV monitors 70, a plurality of (in the second embodiment, four) UV monitors 70 are provided so as to correspond to the respective UV irradiation members 20 provided inside the treatment tank 210. Specifically, as illustrated in FIG. 11, the two UV monitors 70 provided in the top part 213 of the treatment tank 210 are provided so as to correspond to the two UV irradiation members 20 that are arranged in an upper inside region of the treatment tank 210. The other two UV monitors 70 provided in the bottom part 214 of the treatment tank 210 are provided so as to correspond to the two UV irradiation members 20 that are arranged in a lower inside region of the treatment tank 210. The two UV monitors 70 provided in the top part 213 of the treatment tank 210 are provided so as to extend in directions crossing each other. Likewise, the two UV monitors 70 provided in the bottom part 214 of the treatment tank 210 are also provided so as to extend in directions crossing each other.

More specifically, the UV monitor 70 positioned in the upper right-hand side in FIG. 11 is provided so as to face the UV irradiation member 20 provided in the upper left-hand side in FIG. 11 and to extend leftward and downward from the top part 213 of the treatment tank 210. The UV monitor 70 positioned in the upper left-hand side in FIG. 11 is provided so as to face the UV irradiation member 20 provided in the upper right-hand side in FIG. 11 and to extend rightward and downward from the top part 213 of the treatment tank 210. The UV monitor 70 positioned in the lower right-hand side in FIG. 11 is provided so as to face the UV irradiation member 20 provided in the lower left-hand side in FIG. 11 and to extend leftward and upward from the bottom part 214 of the treatment tank 210. The UV monitor 70 positioned in the lower left-hand side in FIG. 11 is provided so as to face the UV irradiation member 20 provided in the lower right-hand side in FIG. 11 and to extend rightward and upward from the bottom part 214 of the treatment tank 210.

Also in the second embodiment, as in the cases of the above first embodiment and first to fourth modifications, the air outlet hole 281a to which the air outlet unit 280 is connected is provided at a position higher than a horizontal plane P2 (see a two-dot chain line in FIG. 11) that passes through the UV light receiving surfaces (lower ends) of the UV sensors 71 of the UV monitors 70 provided in the top part 213 of the treatment tank 210, as illustrated in FIG. 11. The air outlet hole 281a is provided at a position higher than an upper end 211a of the water supply opening 211 and higher than an upper end 212a of the water drainage opening 212.

As described above, also in the second embodiment, as in the cases of the above first embodiment and first to fourth modifications, the air outlet hole 281a is provided at a position higher than the horizontal plane P2 passing through the UV sensors 71. Furthermore, the air outlet unit 280, which is used to release therethrough, to the outside of the treatment tank 210, air (the air layer S) that accumulates in the top part of the treatment tank 210 when the treated water W passes through the inside of the treatment tank 210, is connected to this air outlet hole 281a. Thus, also in the second embodiment, it is possible to prevent air from accumulating between each of the UV sensors 71 provided in the top part 213 of the treatment tank 210 and the UV irradiation member 20 corresponding to that UV sensor 71, thereby it is possible to keep the accuracy of measurement performed by the UV sensors 71 from being impaired.

The above embodiments and modifications can be implemented with the shape and the number of any constituent element therein changed as appropriate. That is, although the exemplary case in which the treatment tank is formed in a box shape or a cylindrical shape is described in each of the above embodiments and modifications, the treatment tank may be formed in a shape that is neither a box shape nor a cylindrical shape. Furthermore, although exemplary cases in which the air outlet unit includes a cylindrical member and a valve member are described in the above embodiments and modifications, the air outlet unit may have a structure other than the above ones as long as the air outlet unit is capable of releasing therethrough air that accumulates in the top part of the treatment tank.

Furthermore, although an exemplary case in which the numbers of UV irradiation members and UV monitors are six or four is described in each of the above embodiments and modifications, the numbers of UV irradiation members and UV monitors may be seven or more, five, or three or less. Furthermore, the numbers of UV irradiation members and UV monitors may not necessarily be the same. Furthermore, although an exemplary case in which the number of air outlet units is one is described in each of the above embodiments and modifications, the number of air outlet units may be two or more.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the cover such forms or modifications as would fall within the scope and spirit of the inventions.

The invention claimed is:

1. An ultraviolet (UV) irradiation apparatus comprising:
   a treatment tank that comprises a water supply opening to supply therethrough treated water to be further treated and a water drainage opening to drain therethrough the treated water;
   a UV irradiation member that is provided inside the treatment tank and irradiates the treated water with UV light when the treated water passes through inside of the treatment tank;
   a UV sensor that is provided inside the treatment tank and measures a dose of UV irradiation from the UV irradiation member;
   an air outlet unit that is connected to an air outlet hole provided at a position higher than a horizontal plane passing through the UV sensor and that is provided to release, to outside of the treatment tank, through the air outlet hole, air that accumulates inside the treatment tank when the treated water passes through the inside of the treatment tank; and
   a measurement unit that measures a vertical position of a water surface of the treated water passing through the inside of the treatment tank, wherein
   the air outlet unit releases, based on a measurement result from the measurement unit, the air through the air outlet hole before the water surface of the treated water lowers below the horizontal plane passing through the UV sensor.

2. The UV irradiation apparatus according to claim 1, wherein
   the water supply opening and the water drainage opening have different inner diameters and are provided at positions horizontally facing each other, and
   the air outlet hole is provided at a position higher than an upper end of the water supply opening and higher than an upper end of the water drainage opening.

3. The UV irradiation apparatus according to claim 1, wherein the air outlet unit comprises:
   a cylindrical member that comprises an inner circumferential surface configuring the air outlet hole; and
   a valve member that blocks the air outlet hole in a manner that allows opening and closing of the air outlet hole.

4. The UV irradiation apparatus according to claim 3, further comprising:
   a valve driver that drives the valve member; and
   a controller that controls the valve driver to cause the valve member to regularly open and close the air outlet hole.

5. The UV irradiation apparatus according to claim 3, further comprising:
   a valve driver that drives the valve member; and
   a controller that controls, based on the measurement result from the measurement unit, the valve driver to cause the valve member to open the air outlet hole before the water surface of the treated water lowers below the horizontal plane passing through the UV sensor.

6. The UV irradiation apparatus according to claim 1, further comprising a buffer tank that is provided in a position higher than an upper end of the treatment tank and in an intermediary portion of the air outlet hole, and that accommodates air accumulating inside the treatment tank.

\* \* \* \* \*